(12) United States Patent
Bogachuk et al.

(10) Patent No.: US 10,703,420 B2
(45) Date of Patent: Jul. 7, 2020

(54) VEHICLE JOINT

(71) Applicant: Ford Global Technologies, LLC, Dearborn, MI (US)

(72) Inventors: Vladimir Vladimirovich Bogachuk, West Bloomfield, MI (US); Shawn Michael Morgans, Chelsea, MI (US); Steve William Gallagher, Bloomfield Hills, MI (US); Michael William Danyo, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/149,591

(22) Filed: Oct. 2, 2018

(65) Prior Publication Data

US 2020/0102021 A1  Apr. 2, 2020

(51) Int. Cl.
*B62D 27/02* (2006.01)
*B62D 27/06* (2006.01)

(52) U.S. Cl.
CPC ......... *B62D 27/023* (2013.01); *B62D 27/065* (2013.01)

(58) Field of Classification Search
CPC ............................ B62D 27/023; B62D 27/065
USPC .. 296/29, 203.01, 204, 205, 203.02, 203.03, 296/203.04
See application file for complete search history.

(56) References Cited

U.S. PATENT DOCUMENTS

| | | | |
|---|---|---|---|
| 6,431,602 B1 | 8/2002 | Ralko et al. | |
| 6,814,397 B2 * | 11/2004 | Henderson | B62D 33/02 296/181.3 |
| 7,086,801 B2 | 8/2006 | Swahn et al. | |
| 7,407,219 B2 * | 8/2008 | Glasgow | B60R 19/18 293/120 |
| 8,783,761 B2 * | 7/2014 | Bisror | B60N 2/012 296/204 |
| 2018/0154947 A1 * | 6/2018 | Stastny | B21D 22/02 |

FOREIGN PATENT DOCUMENTS

| | | |
|---|---|---|
| CN | 202185717 U | 4/2012 |
| CN | 202500856 U | 10/2012 |
| CN | 203793406 U | 8/2014 |
| CN | 204955981 U | 1/2016 |
| CN | 205706871 U | 11/2016 |

OTHER PUBLICATIONS

James W. Zubrick, "Infrared Spectroscopy Part 1 (Laboratory Manual)", retrieved Jul. 17, 2018 from Internet URL: http://what-when-how.com/organic-chemistry-laboratory-survival-manual/infrared-spectroscopy-part-1-laboratory-manual/ (8 pages).

* cited by examiner

*Primary Examiner* — Joseph D. Pape
(74) *Attorney, Agent, or Firm* — David Coppiellie; Bejin Bieneman PLC

(57) ABSTRACT

A vehicle assembly includes a first member including a first side and a second side. The vehicle assembly includes a coupler extending from the first side to the second side, the first side and the second side being crimped to the coupler. The vehicle assembly includes a second member and a fastener fastening the first member and the second member to the coupler.

23 Claims, 8 Drawing Sheets

VEHICLE JOINT

BACKGROUND

A vehicle includes a vehicle body and a vehicle frame. Both the vehicle body and the vehicle frame may include a plurality of members joined together. Some of these members may be joined together by welding and others of these members may be joined by bolts. As one example, bolts may be used to join together members of different materials that are not easily welded together and/or do yield a sufficient weld strength. Bolts can be difficult to package because, as one reason, the heads of the bolts protrude outwardly.

DETAILED DESCRIPTION

Figure 1:
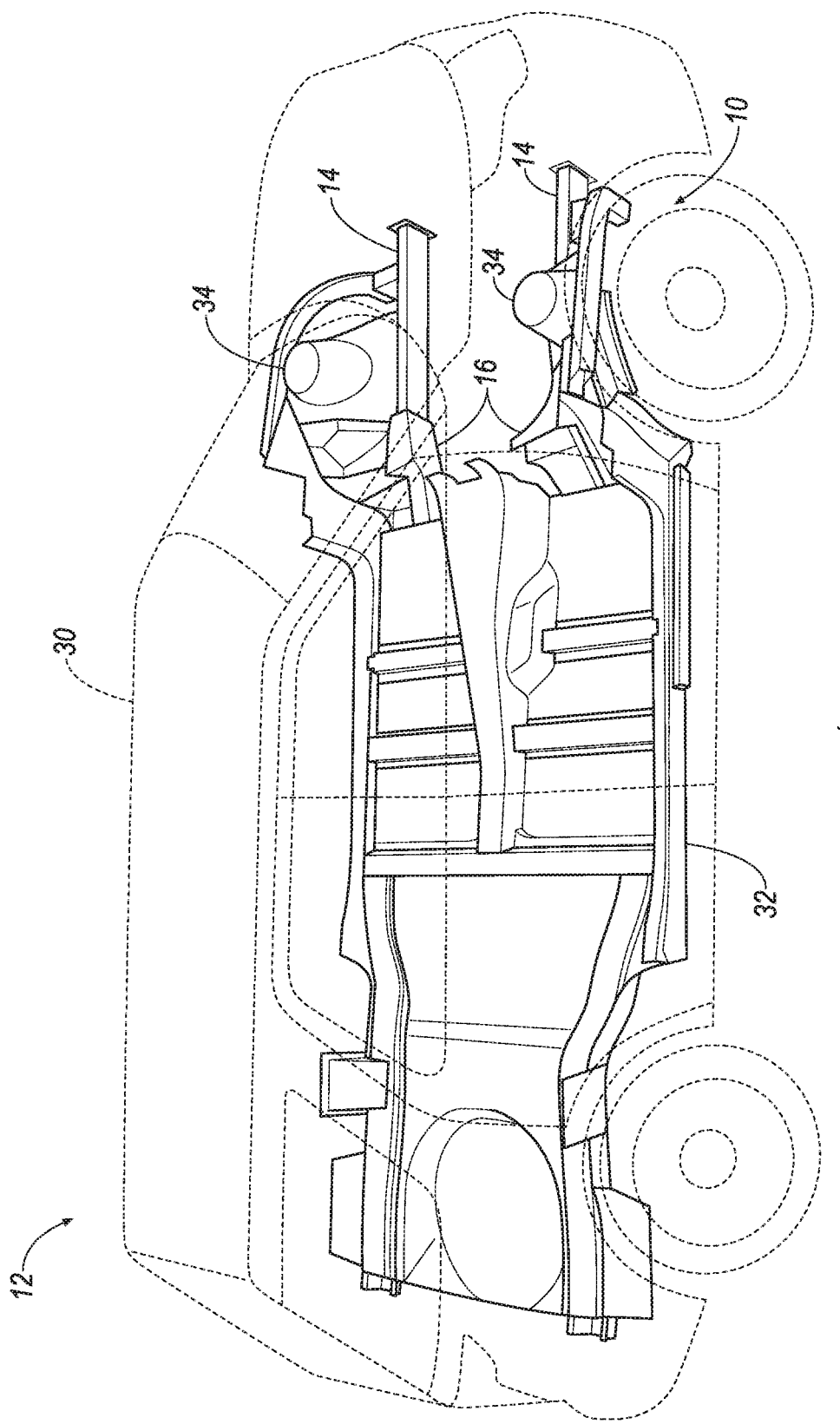
FIG. 1 is a perspective view of a vehicle including a vehicle assembly.

A vehicle assembly includes a first member including a first side and a second side. The vehicle assembly includes a coupler extending from the first side to the second side. The first side and the second side are crimped to the coupler. The vehicle assembly includes a second member and a fastener fastening the first member and the second member to the coupler.

The first member may enclose a cavity between the first and second sides, the coupler being in the cavity.

The coupler may include a bore and the fastener may extend through the first and second member and may engage the bore.

The bore may be threaded and the fastener may threadedly engage the bore.

The fastener may extend through the first side of the first member and a second fastener may extend through the second side of the first member and engages the bore.

The second member may include a first flange and a second flange, the first member being between the first flange and the second flange, the fastener extending through the first flange and the second fastener extending through the second flange.

The first member and the second member may each include a hole and the coupler may include a bore having an axis extending through the holes.

The first side and the second side of the first member may each include a hole and the coupler may include a bore having an axis extending through the holes.

The second member may have a hole and the axis of the bore extends through the hole of the second member.

The second member may include the first flange and the second flange, the first member being between the first flange and the second flange, the first flange and the second flange each having a hole and the axis of the bore extending through the holes of the first flange and the second flange.

The fastener may extend through the first side of the first member and engages the coupler and the second fastener may extend through the second side of the first member and engages the coupler.

The second member may include the first flange and the second flange, the first member being between the first flange and the second flange, the fastener extending through the first flange and the second fastener extending through the second flange.

The coupler may include a body and the first and second sides are crimped on opposite sides of the body.

The vehicle assembly may comprise a boss and bodies extending in opposite directions from the boss, the boss and the bodies extending from the first side to the second side, the first side and the second side each being crimped to the coupler on opposite sides of the boss.

The vehicle assembly may comprise the body and the boss, the body having a ridge, the first side and the second side being crimped between the ridge and the boss.

The vehicle assembly may comprise a third member fastened to the first member and the coupler.

The third member is fastened to the coupler through the second member.

The second member may be fastened to the coupler through the first side of the first member and the third member is fastened to the coupler through the second side of the first member.

The first member may be aluminum and the second member may be steel.

The second member may abut the first member.

With reference to the Figures, wherein like numerals indicate like parts throughout the several views, a vehicle assembly 10 of a vehicle 12 includes a first member 14 and a second member 16. The first member 14 includes a first side 18 and a second side 20. The vehicle assembly 10 includes a coupler 22, 122 extending from the first side 18 to the second side 20. The first side 18 and the second side 20 are crimped to the coupler 22, 122. In other words, a crimp 24 on the first side 18 and a crimp 24 on the second side 20 engage the coupler 22, 122. A fastener 26 fastens the first member 14 and the second member 16 to the coupler 22, 122.

The crimps 24 on the first side 18 and the second side 20 of the first member 14 retain the coupler 22, 122 in position relative to the first member 14 before the fasteners 26 fasten the first member 14 and the second member 16 to the coupler 22, 122. As an example, the crimps 24 retain the coupler 22, 122 in place relative to the first member 14 while the second member 16 is positioned relative to the first member 14. With the coupler 22, 122 retained in place prior to positioning of the second member 16 relative to the first member 14, the fastener 26 may be engaged with the first member 14, the second member 16, and the coupler 22, 122 without any additional assembly equipment and/or assembly steps to position the coupler 22, 122. In other words, the maintenance of the coupler 22, 122 in position relative to the first member 14 by the crimps 24 eliminates the need for additional assembly equipment and/or steps to position the coupler 22, 122 in the first member 14 during assembly of the fastener 26 to the first member 14, the second member 16, and the fastener 26. As set forth below, as another example, the coupler 22, 122 permits fastening of the first member 14 and the second member 16 in examples where the first member 14 and the second member 16 are of different material types. As an example, the first member 14 and the second member may be different material types that are not easily welded, e.g., aluminum and steel. In other words, the vehicle assembly 10 may have mixed-material.

The vehicle 12 may be any suitable type of automobile, e.g., a passenger or commercial automobile such as a sedan, a coupe, a truck, a sport utility vehicle, a crossover vehicle, a van, a minivan, a taxi, a bus, etc.

The vehicle 12 may include a body 30 and a frame 32. The body 30 may be of a unibody construction. In the unibody construction, the body 30, e.g., rockers, serves as the frame 32, and the body 30 (including rockers, pillars, roof rails, etc.) is unitary. As another example, the body 30 and frame 32 may have a body-on-frame construction (also referred to as a cab-on-frame construction). In other words, the body 30 and frame 32 are separate components, i.e., are modular, and the body 30 is supported on and affixed to the frame 32. Alternatively, the body 30 may have any suitable construction. The body 30 may be of any suitable material, for example, steel, aluminum, and/or fiber-reinforced plastic, etc.

The vehicle assembly 10 includes members e.g. the first member 14, the second member 16, a third member 34, etc. The members 14, 16, 34 may be components of the body 30 and/or the frame 32. In other words, the body 30 and/or the frame 32 includes the members 14, 16, 34. As an example, members include the first member 14 and the second member 16. The coupler 22, 122 couples the members 14, 16, 34 together, e.g., couples the first member 14 and the second member 16 together as described below. The vehicle assembly 10 may include any suitable number of members 14, 16, 34 coupled together by the coupler 22, 122. As an example, in addition to the first member 14 and the second member 16, the vehicle assembly 10 may include the third member 34 (as described below) and/or any additional members 14, 16, 34. In addition to or in the alternative to the first member 14, the second member 16, and the third member 34, the vehicle may include any other members. The members 14, 16, 34 are formed separately and subsequently coupled, as described further below. The adjectives "first," "second," and "third" are used merely as identifiers to distinguish between the members 14, 16, 34 and do not signify order or importance. "First," "second," and "third" are used to distinguish the members 14, 16, 34 throughout this description and any of the components fastened to the coupler 22, 122 with the fastener 26 could be referred to as the "first," "second," and/or "third" members 14, 16, 34.

The members 14, 16, 34 may be different types of material. For example, the first member 14 may be aluminum and the second member 16 may be steel. To further this example, in examples including the third member 34, the third member 34 may be of the same type of material as the first member 14 or the second member 16 or may be a different type of material. As another example, one or all of the members 14, 16, 34 may be of the same type of material. As examples, the members 14, 16, 34 may be any suitable material, for example, steel, aluminum, and/or fiber-reinforced plastic, etc.

The members 14, 16, 34 may be any suitable components of the body 30 and/or the frame 32. As an example, the first member 14 shown in the Figures is a frame rail and the second member 16 is a back-up structure. In such an example the fastener 26 fastens the frame rail and the back-up structure to the coupler 22, 122. Further, the third member 34 shown in the Figures is a strut tower, and the fastener 26 fastens the frame rail, the back-up structure, and the strut tower to the coupler 22, 122.

As set forth above, the first member 14 includes the first side 18 and the second side 20. The first side 18 and the second side 20 are spaced from each other. The first member 14 encloses a cavity 42 between the first and second side 20s, and the coupler 22, 122 is in the cavity 42. Specifically, the first member 14 may include a top side 44 and a bottom side 46 spaced from each other and extending from the first side 18 to the second side 20, and in such an example the cavity 42 is enclosed by the first side 18, second side 20, top side 44, and bottom side 46. The first side 18 and the second side 20 may be vertical and the top side 44 and the bottom side 46 may be horizontal. The first member 14 may be tubular. As an example, the first member 14 may be extruded. The first member 14 may be elongated along a vehicle 12 longitudinal axis L.

The first member 14 may include an internal wall 48 in the cavity 42. The internal wall 48 may extend from the first side 18 to the second side 20, i.e., directly connects to the first side 18 and the second side 20. In examples including the top side 44 and the bottom side 46, the internal wall 48 is spaced from and between the top side 44 and the bottom side 46. The internal wall 48 may reinforce the first side 18 and the second side 20. The first member 14 may include any suitable number of internal walls 48.

The first side 18 and the second side 20 of the first member 14 may each include a hole 50 that receives the fastener 26, as described further below. The first side 18 and the second side 20 may include any suitable number of holes 50. In the example shown in the Figures, the first side 18 and the second side 20 each includes five holes 50. The holes 50 may be round, as shown in the Figures, or may be any other suitable shape.

Figure 4:
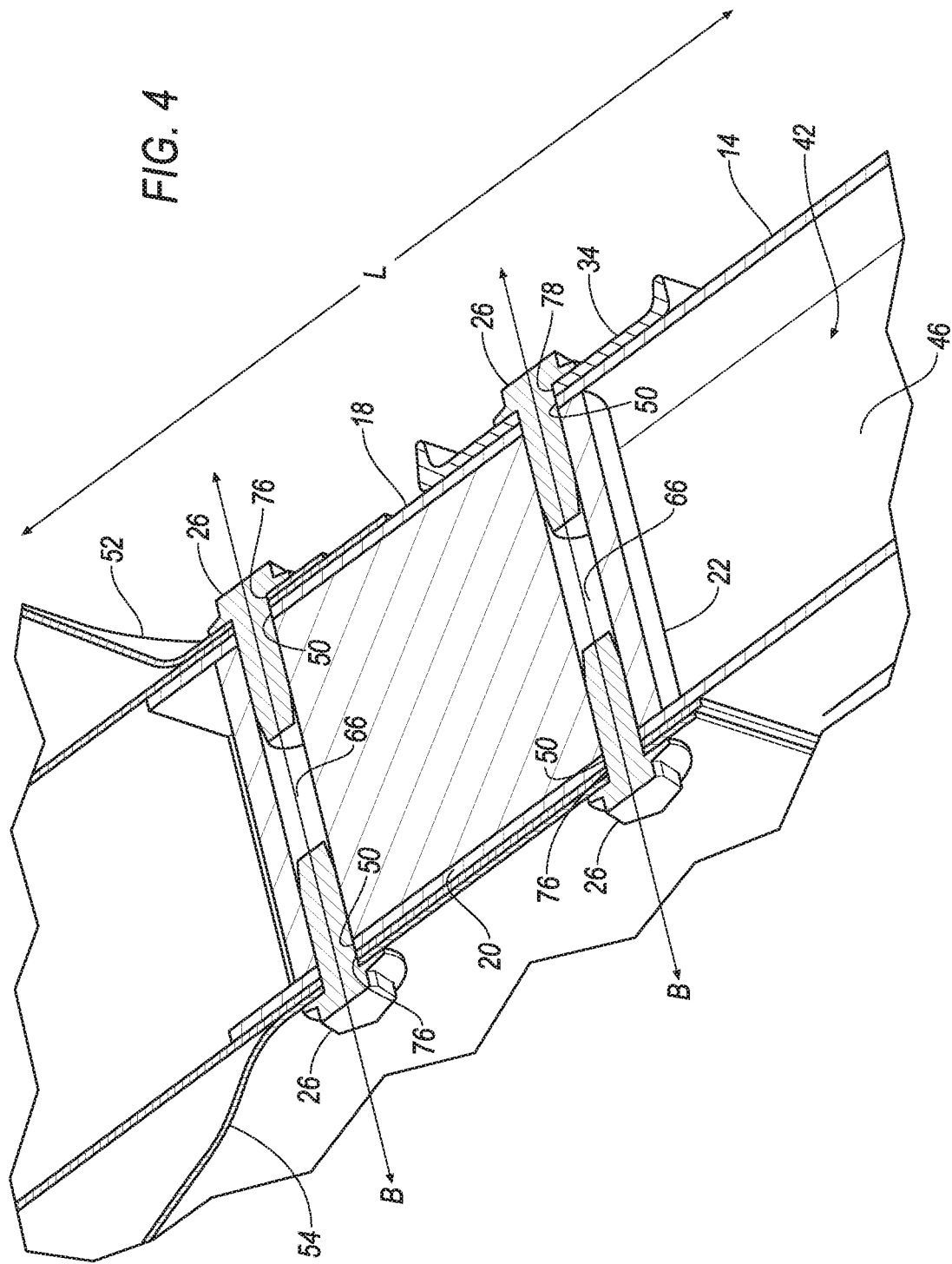
FIG. 4 is a cross-sectional view of the vehicle assembly in a generally horizontal plane showing a coupler and fasteners fastened to the couplers.

The second member 16 may extend along both the first side 18 and the second side 20 of the first member 14. In other words, at least a portion of the first member 14 may be sandwiched between the second member 16. In the example shown in the Figures, an intermediate component, i.e., another member (not numbered), may be disposed between the second member 16 the first side 18 and/or the second side 20. As another example, the second member 16 may abut the first side 18 and/or the second side 20. With reference to FIG. 4, for example, the second member 16 may include a first flange 52 and a second flange 54 and the first member 14 is sandwiched between the first flange 52 and the second flange 54. The first flange 52 and the second flange 54 may be fixed together in any suitable fashion, e.g., unitary formation, welding, fastening, etc.

The third member 34 may extend along the first side 18 and/or the second side 20 of the first member 14. The third member 34 may abut the first member 14, as shown in FIG. 4. As another example another component, e.g., the second member 16 or another member, may be disposed between the third member 34 and the first member 14.

The second member 16 and the third member 34 include at least one hole 76, 78 that receives fasteners 26, as described further below. The second member 16 and the third member 34 may include any suitable number of holes 76, 78. The holes 50, 76, 78 may be round, as shown in the Figures, or may be any other suitable shape.

Figure 2:
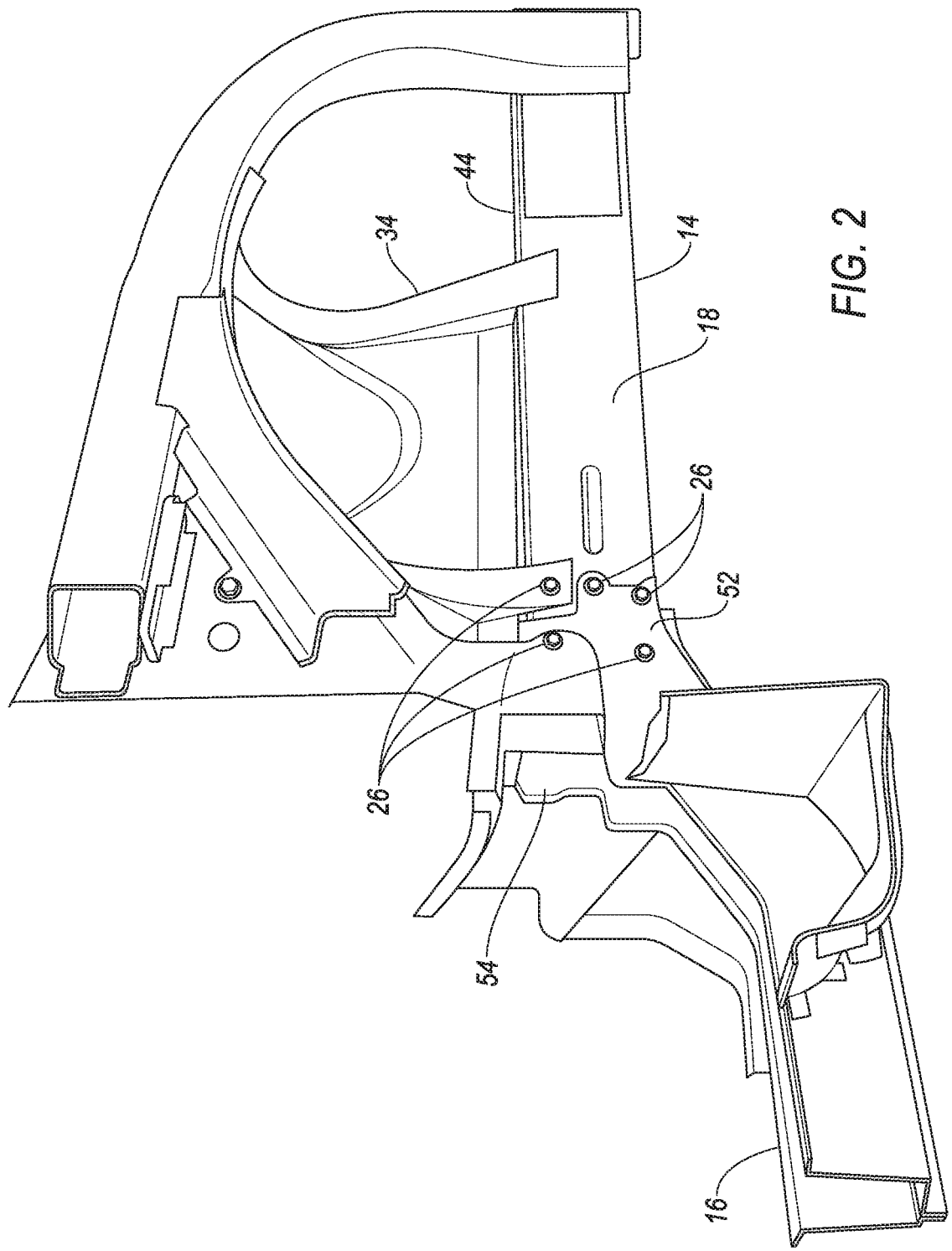
FIG. 2 is a perspective view of the vehicle assembly viewed from an outboard position looking inboard.
Figure 3:
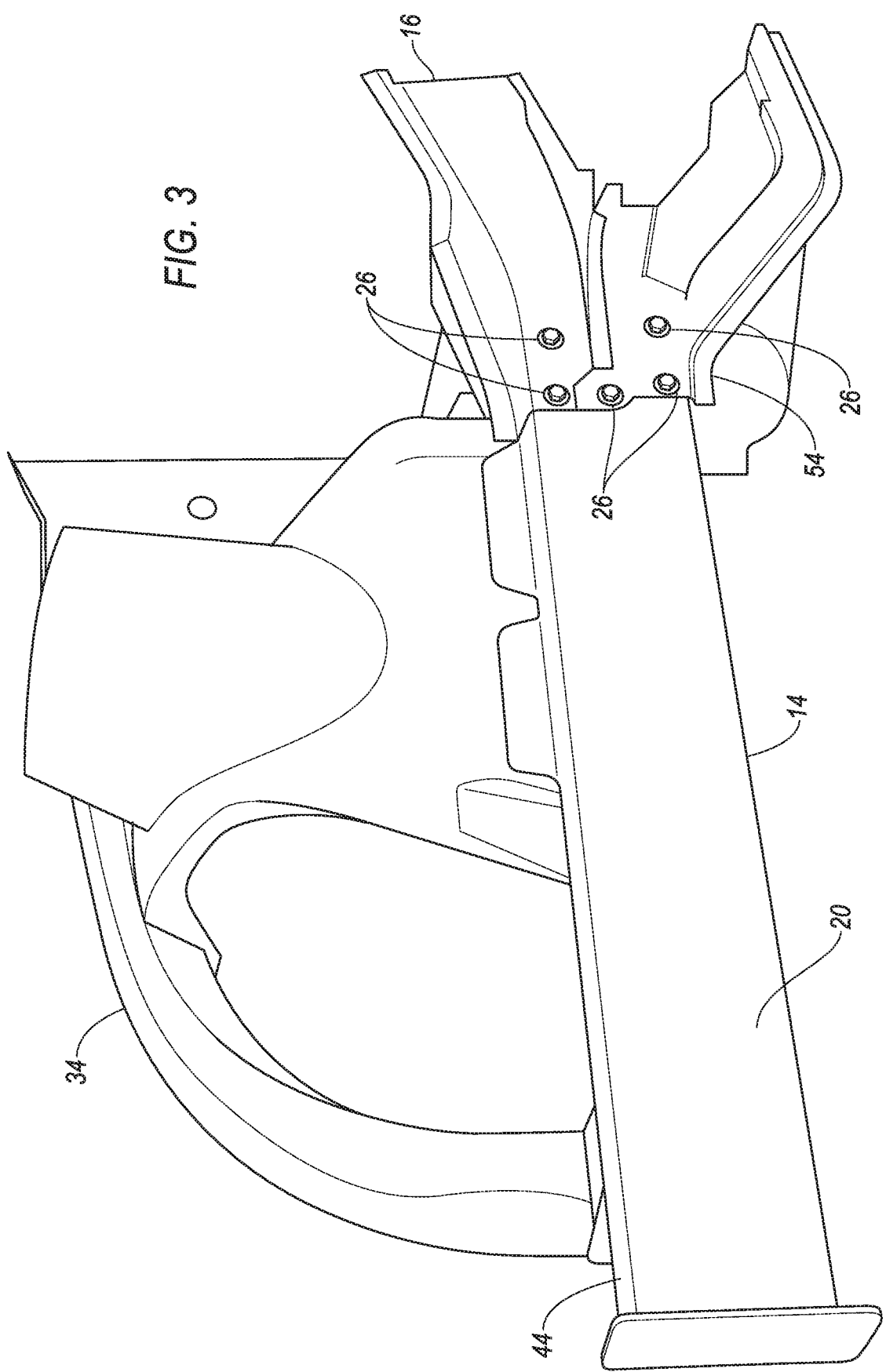
FIG. 3 is a perspective view of the vehicle assembly viewed from an inboard position looking outboard.

With reference to FIGS. 2-4, at least one hole 76 in the second member 16 aligns with at least one hole 50 in the first member 14. Specifically, two holes 50, 76 are aligned then positioned such that one of the fasteners 26 may extend through both holes 50, 76. Similarly, at least one hole 78 in the third member 34 aligns with at least one hole 50 in the first member 14 and/or one hole 76 in the second member 16.

In the example shown in the Figures, and with particular reference to FIG. 4, the second member 16 is fastened to the coupler 22, 122 through the first side 18 and the second side 20 of the first member 14. Specifically, in the Figures, fasteners 26 extend through the first side 18 of the first member 14 and the second member 16 and engage the coupler 22, 122 and fasteners 26 extend through the second side 20 of the first member 14 and the second member 16 and engage the coupler 22, 122. In the example shown in the Figures, and with continued reference particularly to FIG. 4, the third member 34 is fastened to the coupler 22, 122 through the second side 20 of the first member 14. One of the fasteners 26 extends through the second side 20 of the first member 14 and the third member 34 to engage the coupler 22, 122.

The fastener 26 may be threaded. In such an example, the fastener 26 may include a head 56 and a threaded shaft 58. The head 56 applies compressive forces to the components between the head 56 and the coupler 22, 122, and the threaded shaft 58 engages the coupler 22, 122, as set forth below. The fastener 26 may be of any suitable material type, for example, steel.

Figure 5:
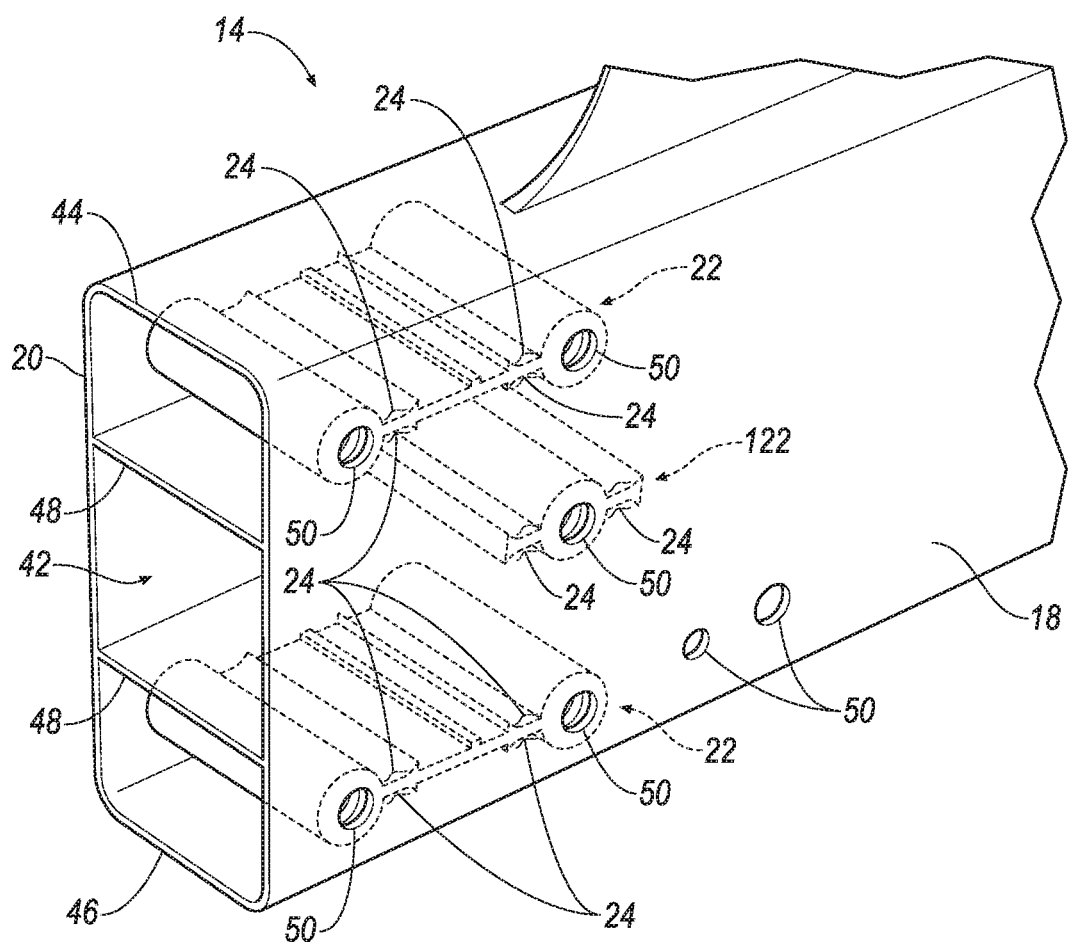
FIG. 5 is a perspective view of a first member of the vehicle assembly with the couplers shown in hidden lines.
Figure 6:
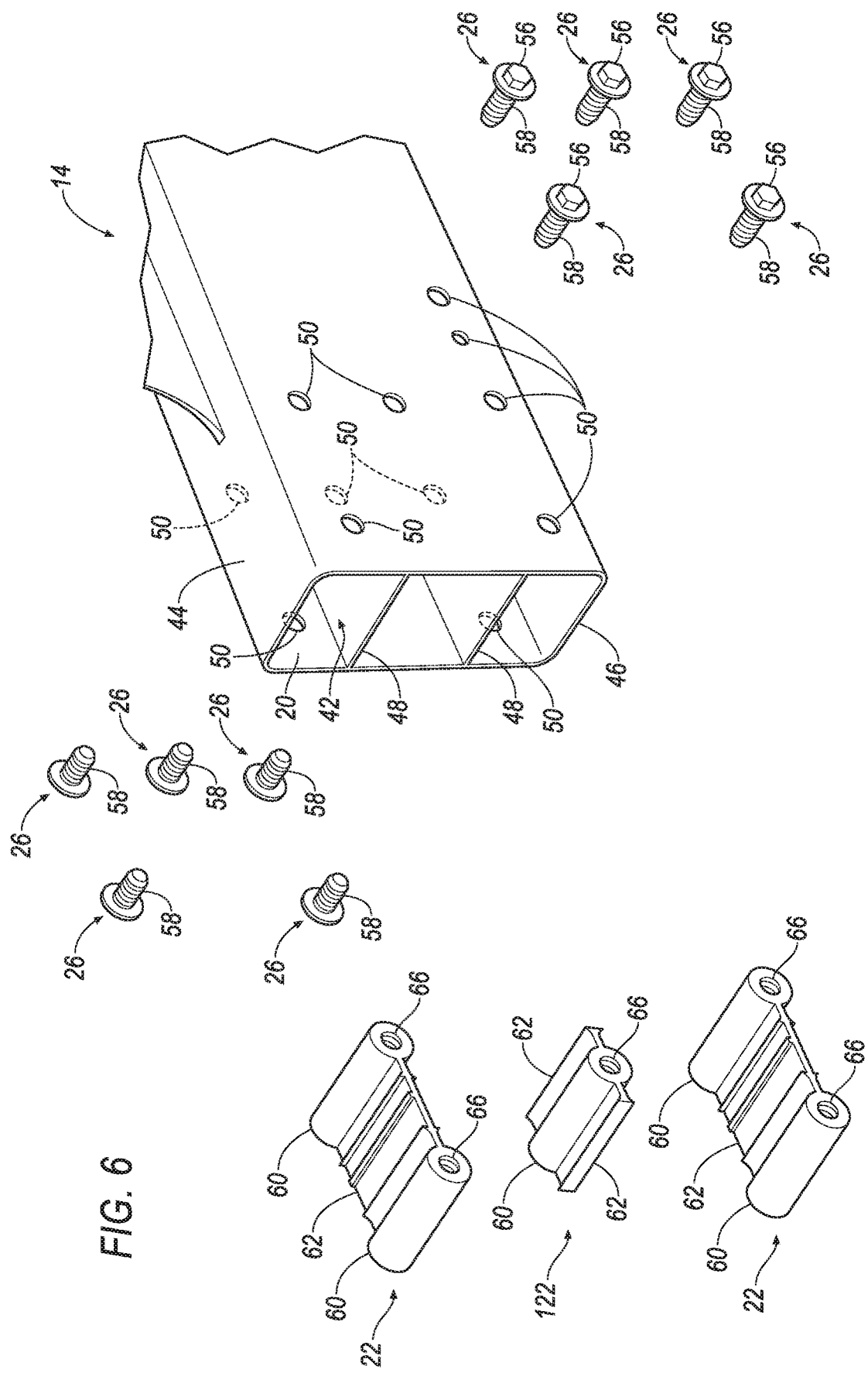
FIG. 6 is an exploded view of the first member, the couplers, and the fasteners.
Figure 7A:
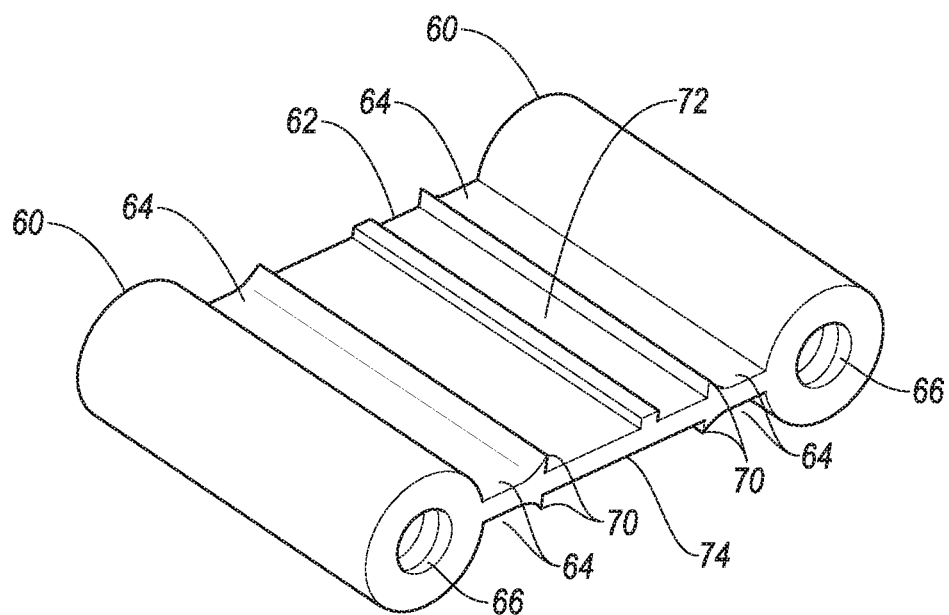
FIG. 7A is a perspective view of a first embodiment of the coupler including a body and two bosses.
Figure 7B:
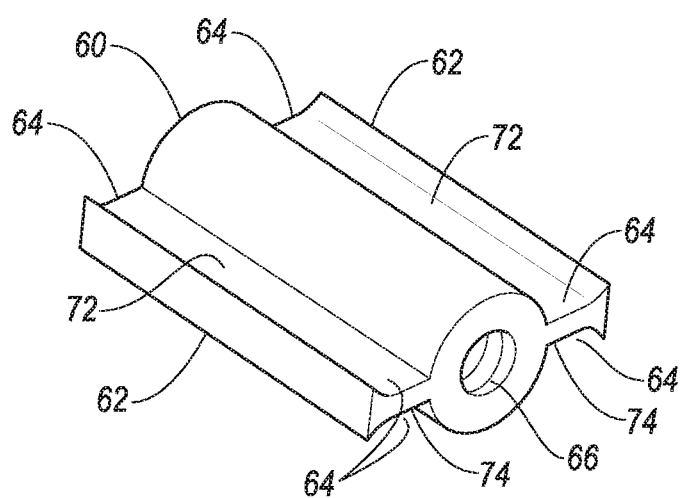
FIG. 7B is a perspective view of a second embodiment of the coupler include one boss and two bodies.

The coupler 22, 122 is disposed between the first side 18 and the second side 20 of the first member 14. Specifically, the coupler 22, 122 extends from the first side 18 to the second side 20, i.e., abuts the first side 18 and the second side 20. The vehicle assembly 10 may include any suitable number of couplers 22 for connecting any suitable number of members 14, 16, 34. One example embodiment of the coupler 22 is shown in FIG. 7A and another example embodiment of the coupler 122 is shown in FIG. 7B. As shown in FIGS. 5 and 6, the vehicle assembly 10 may include both the first embodiment and the second embodiment of the coupler 22, 122. Alternatively, the vehicle assembly 10 may include one or more of a single embodiment of the coupler 22, 122. The coupler 22, 122 may be any suitable material, for example, steel, aluminum, fiber-reinforced plastic, etc.

As set forth above, the first side 18 and the second side 20 of the first member 14 are crimped to the coupler 22, 122. In other words, crimps 24 on the first side 18 and the second side 20 engage the coupler 22, 122. The crimps 24 are deformations in the first side 18 and the second side 20 that protrude into the cavity 42 and engage the coupler 22, 122. The crimps 24 may be formed by a crimping tool. Specifically, for example, the first member 14 may be extruded and the crimping tool may apply compressive forces to the first side 18 and the second side 20 to create the crimps 24. The internal walls 48 and/or the bottom wall may support the couplers 22 prior to the formation of the crimp 24. The coupler 22, 122 may be inserted into the cavity 42 at a free end of the first member 14, as shown in FIGS. 5 and 6. The coupler 22, 122 may be positioned in the cavity 42 in any suitable fashion prior to formation of the crimps 24.

The coupler 22, 122 may include at least one boss 60 and at least one body 62 extending from the boss 60. Each body 62 and boss 60 extends from the first side 18 to the second side 20 of the first member 14. The crimps 24 may be at an intersection of the body 62 and the boss 60. Specifically, the boss 60 may be larger than the body 62, e.g., in a vertical direction, and the boss 60 and body 62 may define a notch 64 therebetween. The crimps 24 may be disposed at the notch 64 to restrain movement of the coupler 22, 122 relative to the first member 14. As another example, in addition to or in the alternative to the crimps 24 being at the notches 64, the crimps 24 may be at any location around the body 62 and the boss 60. As an example, one or more crimps 24 may be elongated along the body 62 and/or the boss 60.

The coupler 22, 122 includes a bore 66. The bore 66 extends through the coupler 22, 122 from the first side 18 to the second side 20 of the first member 14. As an example, the boss 60 of the coupler 22, 122 may include the bore 66. The bore 66 is configured to engage the fastener 26. For example, in the example where the fastener 26 is threaded, the bore 66 may be threaded to threadedly engage the fastener 26.

The bore 66 includes an axis B. The axis B is transverse to the first side 18 and the second side 20. The holes 50, 76, 78 of the members 14, 16, 34 and the bores 66 are axially aligned. The axis B extends through the holes 50, 76, 78 of the members 14, 16, 34. The fasteners 26 extend through the holes 50, 76, 78 along the axis B and engage the bore 66.

The body 62 may include a ridge 70. The ridge 70 may extend from the first side 18 to the second side 20 of the first member 14. As shown in the Figures, the body 62 may include more than one ridge 70. For example, each body 62 may include a ridge 70 adjacent each boss 60. The crimps 24 may be disposed between the ridge 70 and the adjacent one of the bosses 60. Specifically, the notch 64 between the body 62 and the boss 60 may also be defined by the adjacent ridge 70. The body 62 may include a top surface 72 and a bottom surface 74. One or more ridges 70 may be disposed on the top surface 72 and/or the bottom surface 74.

In the embodiment shown in FIG. 7A, the coupler 22 includes two bosses 60 and the body 62 of the coupler 22 extends from one boss 60 to the other boss 60. With continued reference to FIG. 7A, the coupler 22 may include two ridges 70 on the top surface 72 and two ridges 70 on the bottom surface 74. The ridges 70 and bosses 60 define four notches 64, specifically, two notches 64 at the top surface 72 and two notches 64 at the bottom surface 74. When assembled to the first member 14, the first side 18 and the second side 20 of the first member 14 may include each include crimps 24 at each of the notches 64.

In the embodiment shown in FIG. 7B, the coupler 122 may include one boss 60 and two bodies 62 extending in opposite directions from the boss 60. With continued reference to FIG. 7B, each body 62 may include one ridge 70 on the top surface 72 and one ridge 70 on the bottom surface 74. The ridges 70 and the boss 60 define four notches 64. The first side 18 and the second side 20 are crimped on opposite sides of the body 62. Specifically, the first side 18 and the second side 20 of the first member 14 may each include crimps 24 at each of the notches 64.

Figure 8:
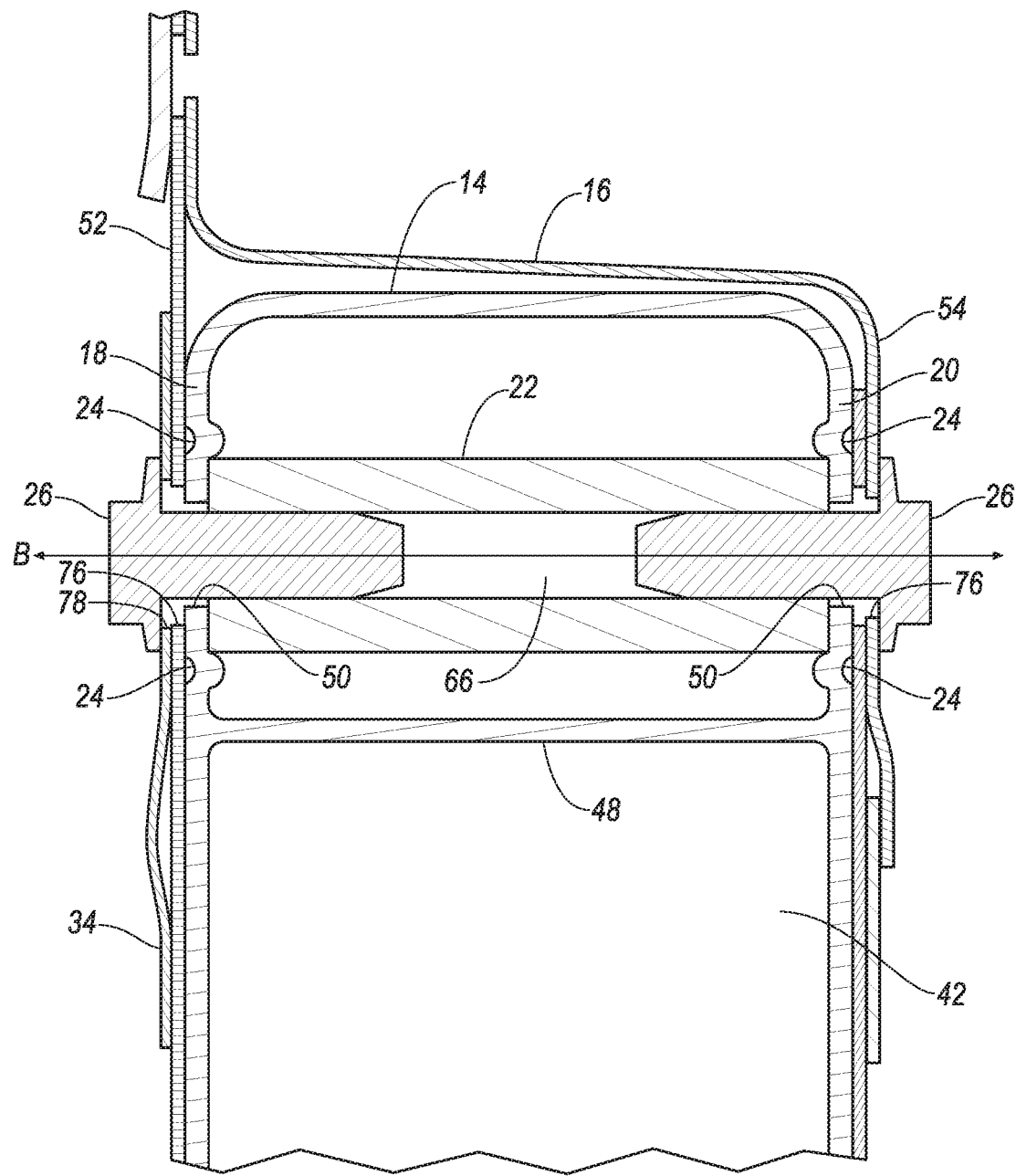
FIG. 8 is a cross-sectional view of a portion of the vehicle assembly in a generally vertical plane.

During assembly, the vehicle members 14, 16, 34 are separately formed and subsequently fastened. The coupler 22, 122 may be positioned in the cavity 42 and then crimped to the first side 18 and the second side 20. The crimping fixes the coupler 22, 122 to a desired position in the cavity 42. With the coupler 22, 122 fixed in position, the holes 76, 78 of second member 16 and the third member 34 are aligned with the holes 50 in the first member 14 such that the fasteners 26 may be fastened to the coupler 22, 122, through the holes 50, 76, 78. As shown in FIGS. 4 and 8, the head 56 of the fastener 50 pinches the material of the members 14, 16, 34 against the coupler 22, 122. This eliminates clearance between the members 14, 16, 34 and the coupler 22, 122 to increase strength where the members 14, 16, 34 at the coupler 22, 122. In other words, the material of the members 14, 16, 34 form a continuous path of material from the fastener 50 to the coupler 22, 122. Such a configuration allows for free insertion of the coupler 22, 122 into the member 14, 16, 34, i.e., there is clearance during installation of the coupler 22, 122 into the member 14, 16, 34, and accommodates varying manufacturing tolerances of the members 14, 16, 34 and the coupler 22, 122 because the fasteners 50 pinch the members 14, 16, 34 to the coupler 22, 122 thus eliminating the clearance regardless of differences in tolerances. This also avoids oil-canning of any of the members 14, 16, 34 when the fastener 50 is fastened to the coupler 22, 122. Specifically, since the coupler 22, 122 is inserted at a free end of the first member 14, the holes 50 may be sized only slightly larger than the shaft 58 of the fastener 50 to provide support for the second and third members 16, 34 when the shaft 58 is fastened to the coupler 22, 122.

In use, coupler 22, 122 extending from the first side 18 to the second side 20 may structurally support the first member 14 and reinforce the first member 14. The reinforcement may eliminate deformation or buckling of the members 14, 16, 34 that may occur during engagement of the fasteners. Additionally, the reinforcement may manage the kinetic energy of the vehicle 12 in an impact and transmit forces to the members 14, 16, 34. Since the coupler 22, 122 extends from the first side 18 to the second side 20, fasteners 26 are engaged on both sides, i.e. an inboard and an outboard side. The use of two fasteners 26 to join the members 14, 16, 34 to through the coupler 22, 122 may enable the use of low profile fasteners 26 and thereby decrease package space.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle assembly comprising:
   a first member including a first side and a second side; and
   a coupler extending from the first side to the second side, the first side and the second side being crimped to the coupler;
   a second member; and
   a fastener fastening the first member and the second member to the coupler;
   wherein the second member abuts the first member.

2. The vehicle assembly of claim 1, wherein the first member encloses a cavity between the first and second sides, the coupler being in the cavity.

3. The vehicle assembly of claim 1, wherein the coupler includes a bore and the fastener extends through the first and second member and engages the bore.

4. The vehicle assembly of claim 3, wherein the bore is threaded and the fastener threadedly engages the bore.

5. The vehicle assembly of claim 3, wherein the fastener extends through the first side of the first member and further comprising a second fastener extending through the second side of the first member and engages the bore.

6. The vehicle assembly of claim 5, wherein the second member includes a first flange and a second flange, the first member being between the first flange and the second flange, the fastener extending through the first flange and the second fastener extending through the second flange.

7. The vehicle assembly of claim 1, wherein the first member and the second member each include a hole and the coupler includes a bore having an axis extending through the holes.

8. The vehicle assembly of claim 1, wherein the first side and the second side of the first member each include a hole and the coupler includes a bore having an axis extending through the holes.

9. The vehicle assembly of claim 8, wherein the second member has a hole and the axis of the bore extends through the hole of the second member.

10. The vehicle assembly of claim 8, the second member includes a first flange and a second flange, the first member being between the first flange and the second flange, the first flange and the second flange each having a hole and the axis of the bore extending through the holes of the first flange and the second flange.

11. The vehicle assembly of claim 1, wherein the fastener extends through the first side of the first member and engages the coupler and further comprising a second fastener extending through the second side of the first member and engages the coupler.

12. The vehicle assembly of claim 11, wherein the second member includes a first flange and a second flange, the first member being between the first flange and the second flange, the fastener extending through the first flange and the second fastener extending through the second flange.

13. The vehicle assembly of claim 1, wherein the coupler includes a body and the first and second sides are crimped on opposite sides of the body.

14. The vehicle assembly of claim 1, further comprising a boss and bodies extending in opposite directions from the boss, the boss and the bodies extending from the first side to the second side, the first side and the second side each being crimped to the coupler on opposite sides of the boss.

15. The vehicle assembly of claim 1, further comprising a body and a boss, the body having a ridge, the first side and the second side being crimped between the ridge and the boss.

16. The vehicle assembly of claim 1, further comprising a third member fastened to the first member and the coupler.

17. The vehicle assembly of claim 16, wherein the third member is fastened to the coupler through the second member.

18. The vehicle assembly of claim 17, wherein the second member is fastened to the coupler through the first side of the first member and the third member is fastened to the coupler through the second side of the first member.

19. The vehicle assembly of claim 1, wherein the first member is aluminum and the second member is steel.

20. The vehicle as set forth in claim 1, wherein the first side faces the second side with a cavity therebetween.

21. A vehicle assembly comprising:
   a first member including a first side and a second side; and
   a coupler extending from the first side to the second side, the first side and the second side being crimped to the coupler;
   a second member; and
   a fastener fastening the first member and the second member to the coupler;
   wherein the fastener extends through the first side of the first member and engages the coupler and further comprising a second fastener extending through the second side of the first member and engages the coupler.

22. A vehicle assembly comprising:
   a first member including a first side and a second side; and
   a coupler extending from the first side to the second side, the first side and the second side being crimped to the coupler;
   a second member;

a fastener fastening the first member and the second member to the coupler; and wherein the coupler includes a boss and bodies extending in opposite directions from the boss, the boss and the bodies extending from the first side to the second side, the first side and the second side each being crimped to the coupler on opposite sides of the boss.

23. A vehicle assembly comprising:

a first member including a first side and a second side; and a coupler extending from the first side to the second side, the first side and the second side being crimped to the coupler;

a second member;

a fastener fastening the first member and the second member to the coupler; and wherein the coupler includes a body and a boss, the body having a ridge, the first side and the second side being crimped between the ridge and the boss.

* * * * *